May 6, 1952     L. S. GUETTI     2,595,940
SPEEDOMETER CABLE CONNECTING AND LOCKING DEVICE
Filed Dec. 20, 1946
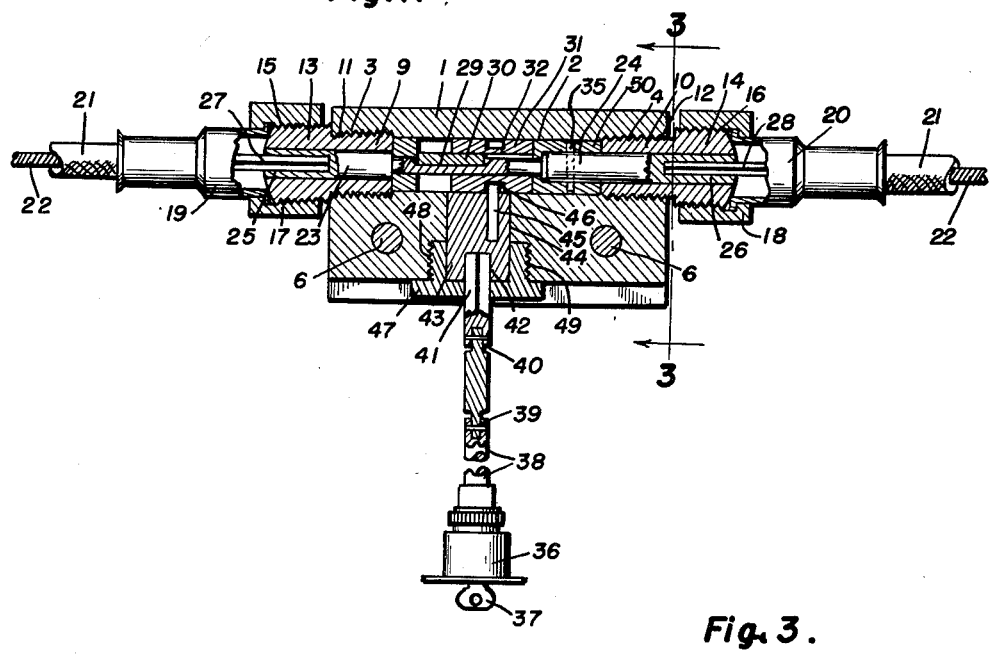
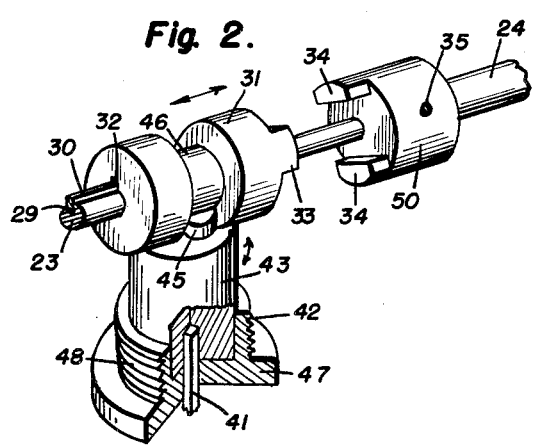
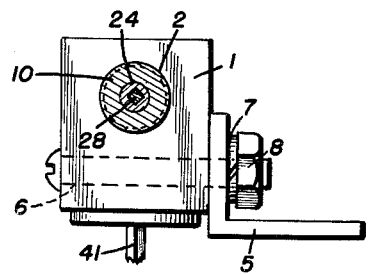
Inventor
Lorenzo S. Guetti
By *Clarence A. O'Brien and Harvey B. Jacobson*
Attorneys Patented May 6, 1952

2,595,940

UNITED STATES PATENT OFFICE 2,595,940

SPEEDOMETER CABLE CONNECTING AND LOCKING DEVICE

Lorenzo S. Guetti, Miami, Fla.

Application December 20, 1946, Serial No. 717,415

10 Claims. (Cl. 264—2)

This invention relates to improvements in speedometer cable connecting and locking devices.

An object of the invention is to provide an improved speedometer cable connecting and locking device adapted to be disposed in a speedometer cable between its connection with the transmission of an automobile and a speed control governor therefor, said device including a lock connected therewith disposed upon the automobile dash or instrument board whereby the speed control governor may be connected with the speedometer cable and locked so that the automobile may not be driven at excessive speed.

Another object of the invention is to provide an improved speedometer cable connecting and locking device which will be suitably supported beneath the dash of an automobile and provided with an eccentric operated clutch means interposed between the speedometer cable connection with the transmission of the automobile and a speed control governor therefor, the same being controlled and operated by an eccentric locking device from a lock disposed on the automobile dash or instrument board to selectively disengage or engage the speed control governor with the speedometer cable for positively controlling and limiting the speed of the automobile when necessary or desirable.

A further object of the invention is to provide an improved speedometer cable connecting and locking device remotely controlled from the dash of an automobile for clutching or declutching a speed control governor with the speedometer drive cable connected with the transmission of an automobile, said device being highly efficient in operation, and relatively inexpensive to manufacture and produce.

Other objects will appear as the description proceeds.

In the accompanying drawing which forms a part of this application,

Figure 1 is a longitudinal sectional view through the improved speedometer cable connecting and locking device;

Figure 2 is an enlarged perspective view of the double clutch and eccentric operating means therefor; and Figure 3 is a detail sectional view taken substantially on the plane of section line 3—3 of Fig. 1.

Like characters of reference are used throughout the following specification and the accompanying drawing to designate corresponding parts.

In carrying out the invention, there is provided an improved speedometer cable connecting and locking device including a casing or housing 1 which is provided with a longitudinally extending bore 2 formed throughout its length, the same being internally threaded as at 3 and 4 at its opposite ends.

An L-shaped supporting bracket 5 is secured to the casing or housing 1 by means of the bolts 6, lock washer 7 and nuts 8 for attaching the device beneath the dash (not shown) of an automobile.

The centrally bored bushings 9 and 10 are externally threaded at 11 and 12 for threading into the internally threaded ends 3 and 4 of the bore 2 in the casing or housing 1, and are formed with the enlarged outer head portions 13 and 14 which are externally threaded at 15 and 16 to receive and support the internally threaded gland nuts or packing glands 17 and 18 disposed about the terminal sleeves 19 and 20 on the speedometer cable casing or sheath 21 in which the cable 22 is rotatably disposed.

The aligned shaft sections 23 and 24 are rotatably supported between the bushings 9 and 10, and are formed with the square sockets 25 and 26 in their outer ends to receive the square terminal ends 27 and 28 of the speedometer cable 22, being rotatable therewith and thereby.

A key slot 29 is formed in the shaft section 23 and supports the key 30 which guides the reciprocating double clutch member 31 as it slides back and forth on said shaft section 23. A key slot 32 is also formed in the clutch member 31 to receive said key 30. Inwardly extending spaced clutch fingers 33 are formed integrally on the inner end of the clutch member 31, and cooperate with similarly formed inwardly extending clutch fingers 34 formed integrally on the inner end of the fixed clutch member 50 disposed on the shaft section 24 being held in fixed position thereon by means of the pin 35 which extends through the fixed clutch member 50 and through said shaft section 24.

It will be seen that the speedometer cable supporting shaft sections 23 and 24 may be clutched together or declutched by shifting the reciprocating clutch member 31 lengthwise in the casing or housing 1.

A combined speedometer cable connecting and locking actuating device will include a lock 36 of any desired type having a key 37 and being mounted upon the automobile dash (not shown). The movable inner body of the block will be connected by the cable 38 in which the pivoted or universal joints 39 and 40 are disposed, and will be provided with a square terminal head member 41 which will be received in a square socket 42 in the rotatable eccentric clutch operating plug 43 mounted in a bore 44 in said casing or housing 1 at right angles to the bore 2, and in communication therewith.

The clutch actuating pin 45 will be supported in the end of the plug 43 in an off-center position and will extend into the annular channel 46 in the reciprocating clutch member 31, whereby rotation of the key 37 in the lock 36 will cause the eccentric movement of the pin 45 to clutch the clutch members 31 and 50 together, after which the key 37 may be removed and the speed of the automobile be controlled by the speed control governor (not shown) which will be positively connected with the speedometer cable 22. When the key 37 is inserted in the lock 36 and turned in the opposite direction, the clutch members 31 and 50 will be declutched, and the automobile may be driven at any desired speed within its limits.

A locking bushing 47 will be externally threaded at 48 to thread into the internally threaded offset bore 48 at the outer end of the bore 44 in the casing or housing 1.

From the foregoing description, it will be apparent that a highly efficient form of speedometer cable connecting and locking device will have been devised and provided which will positively connect a speed control governor to the speedometer cable of an automobile when it is desired to control the speed thereof.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. Means for detachably connecting a speedometer drive and a speed control governor comprising a casing, having a longitudinally extending bore therethrough, longitudinally aligned drive and driven shaft sections rotatably disposed in said bore at the ends thereof, a fixed clutch member on one of said shaft sections, a movable complementary clutch member on the other of said shafts, a transverse bore in said casing in communication with the longitudinally extending bore, a rotatable plug in said transverse bore, an actuating finger carried by said plug in engagement with said movable clutch member and means for rotating said plug in opposite directions and selectively locking the clutch members in connected and disconnected positions.

2. The combination of claim 1, wherein said actuating finger extends eccentrically from the plug.

3. The combination of claim 1, wherein said movable clutch has an annular channel within which the end of the actuating finger is transversely received.

4. A clutch mechanism comprising a casing having a longitudinally extending passage therein, drive and driven cables each including a flexible shaft and a sheath rotatably housing said shaft, means for attaching said sheaths to opposite ends of said casing in axial alignment with said passage, a fixed clutch member on one of said shafts, a movable complementary clutch member on the other of said shafts, said casing having a transverse bore therein in communication with said longitudinal passage, a rotatable plug in said transverse bore, an actuating finger carried by said plug and in engagement with said movable clutch member, and means for selectively rotating said plug to connect and disconnect said shafts.

5. A clutch mechanism comprising a casing having a longitudinally extending passage therein, drive and driven cables each including a flexible shaft and a sheath rotatably housing said shaft, means for attaching said sheaths to opposite ends of said casing in axial alignment with said passage, a fixed clutch member on one of said shafts, a movable complementary clutch member on the other of said shafts, said casing having a transverse bore therein in communication with said longitudinal passage, a rotatable plug in said transverse bore, an actuating finger carried by said plug and in engagement with said movable clutch member, and means for selectively rotating said plug to connect and disconnect said shafts, key actuated means for locking said plug in its shaft connecting position.

6. A clutch mechanism comprising a casing having a longitudinally extending passage therein, a pair of glands each detachably disposed in opposite ends of said passage, first and second cables each including a flexible shaft and sheath rotatably housing said shaft, means for attaching each of said sheaths to one of said glands in axial alignment with said passage, a first and second shaft section each rotatably journaled in one of said glands, cooperating means on each of said shafts and said shaft sections for detachably coupling said first and second shafts to said first and second shaft sections, respectively, a fixed clutch member disposed in said passage and fixedly attached to said first shaft section, said fixed clutch member engaging the inner end of one of said glands to limit outward movement of said first shaft section, a movable complementary clutch member slidably and non-rotatably disposed on said second shaft section, and means for selectively moving said movable clutch member into and out of engagement with said fixed clutch member.

7. A clutch mechanism comprising a casing having a longitudinally extending passage therein, a pair of glands each detachably disposed in opposite ends of said passage, first and second cables each including a flexible shaft and sheath rotatably housing said shaft, means for attaching each of said sheaths to one of said glands in axial alignment with said passage, a first and second shaft section each rotatably journaled in one of said glands, cooperating means on each of said shafts and said shaft sections for detachably coupling said first and second shafts to said first and second shaft sections, respectively, a fixed clutch member disposed in said passage and fixedly attached to said first shaft section, said fixed clutch member engaging the inner end of one of said glands to limit outward movement of said first shaft section, a shank on the inner end of said second shaft section, a flange carried by said shank and engaging the inner end of the other of said glands to limit outward movement of said second shaft section, a movable complementary clutch member slidably and non-rotatably attached to said shank, and means for selectively moving said movable clutch member into and out of engagement with said fixed clutch member.

8. The combination of claim 7 wherein said shank is rotatably journaled in said fixed clutch member.

9. A clutch mechanism comprising a casing having a longitudinally extending passage therein, a pair of glands each detachably disposed in opposite ends of said passage, first and second cables each including a flexible shaft and sheath rotatably housing said shaft, means for attaching each of said sheaths to one of said glands in axial alignment with said passage, a first and second shaft section each rotatably journaled in one of said glands, cooperating means on each of said shafts and said shaft sections for detachably coupling said first and second shafts to said first and second shaft sections, respectively, a fixed clutch member disposed in said passage and fixedly attached to said first shaft section, said fixed clutch member engaging the inner end of one of said glands to limit outward movement of said first shaft section, a shank on the inner end of said second shaft section, a flange carried by said shank and engaging the inner end of the other of said glands to limit outward movement of said second shaft section, a movable complementary clutch member slidably and non-rotatably attached to said shank, said casing having a transverse bore communicating with said passage, a plug rotatably disposed in said bore, said movable clutch member having an annular recess, a finger on the inner end of said plug received in said recess to reciprocate said movable clutch member in response to rotation of said plug.

10. A clutch mechanism comprising a casing having a longitudinally extending passage therein, a pair of glands each detachably disposed in opposite ends of said passage, first and second cables each including a flexible shaft and sheath rotatably housing said shaft, means for attaching each of said sheaths to one of said glands in axial alignment with said passage, a first and second shaft section each rotatably journaled in one of said glands, cooperating means on each of said shafts and said shaft sections for detachably coupling said first and second shafts to said first and second shaft sections, respectively, a fixed clutch member disposed in said passage and fixedly attached to said first shaft section, said fixed clutch member engaging the inner end of one of said glands to limit outward movement of said first shaft section, a shank on the inner end of said second shaft section, a flange carried by said shank and engaging the inner end of the other of said glands to limit outward movement of said second shaft section, a movable complementary clutch member slidably and non-rotatably attached to said shank, said casing having a transverse bore communicating with said passage, a plug rotatably disposed in said bore, said movable clutch member having an annular recess, a finger on the inner end of said plug received in said recess to reciprocate said movable clutch member in response to rotation of said plug, key actuated means for selectively rotating said plug.

LORENZO S. GUETTI.

REFERENCES CITED

The following references are of record in the file of this patent:

UNITED STATES PATENTS

| Number | Name | Date |
| --- | --- | --- |
| 788,204 | Goetze | Apr. 25, 1905 |
| 1,127,607 | Emanuel | Feb. 9, 1915 |
| 1,621,769 | Dorer | Mar. 22, 1927 |
| 2,130,088 | Howard | Sept. 13, 1938 |
| 2,203,446 | Shearer | June 4, 1940 |
| 2,225,206 | Cassels | Dec. 17, 1940 |
| 2,283,478 | Warren | May 19, 1942 |
| 2,334,720 | Marsh | Nov. 23, 1943 |